United States Patent [19]
Angel

[11] Patent Number: 6,016,996
[45] Date of Patent: *Jan. 25, 2000

[54] AIRBORNE APPARATUS FOR GROUND EROSION REDUCTION

[75] Inventor: Robert G. A. Angel, Farnborough, United Kingdom

[73] Assignee: British Aerospace Plc, Hampshire, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/655,751

[22] Filed: May 30, 1996

[30] Foreign Application Priority Data

Jun. 2, 1995 [GB] United Kingdom ............ 9511159

[51] Int. Cl.⁷ ................................................. B64F 1/26
[52] U.S. Cl. ................................................. 244/114 B
[58] Field of Search ............... 244/114 R, 53 R, 244/117 A, 63, 1 R, 110 E; 239/127.1, 127.2; 60/39.58, 39.05, 39.53

[56] References Cited

U.S. PATENT DOCUMENTS

| | | | |
|---|---|---|---|
| 2,359,108 | 9/1944 | Hoskins | 60/39.58 |
| 2,669,091 | 2/1954 | Schutte | 60/39.05 |
| 2,692,024 | 10/1954 | Burdett, Jr. et al. | 244/114 B |
| 2,990,905 | 7/1961 | Lilley . | |
| 3,001,451 | 9/1961 | Urban et al. | 244/114 B |
| 3,226,063 | 12/1965 | Wagner | 244/114 B |
| 3,618,701 | 11/1971 | MacDonald . | |
| 4,398,667 | 8/1983 | Maestrello . | |
| 4,551,971 | 11/1985 | Suzuki | 60/39.53 |

FOREIGN PATENT DOCUMENTS

| | | | |
|---|---|---|---|
| 202822 | 4/1959 | Austria | 60/39.58 |
| 300094 | 6/1962 | France . | |
| 1756595 | 6/1968 | Germany . | |
| 851273 | 10/1960 | United Kingdom . | |
| 910679 | 11/1962 | United Kingdom . | |
| 957918 | 5/1964 | United Kingdom . | |
| 1026068 | 4/1966 | United Kingdom . | |
| 1028041 | 5/1966 | United Kingdom . | |
| 1105817 | 3/1968 | United Kingdom . | |
| 2033484 | 5/1980 | United Kingdom . | |

OTHER PUBLICATIONS

SPACEFLIGHT, vol.17 No. 11, Nov. 11, 1975, published Oct. 15, 1975 by the British Interplanetary Society, ASTP Mission Report–2 by David Baker p. 386, lines 35–39.

Primary Examiner—Galen L. Barefoot
Attorney, Agent, or Firm—Pillsbury Madison & Sutro LLP

[57] ABSTRACT

Apparatus for reducing ground erosion caused by impinging hot jets such as the lifting jets of VSTOL aircraft or rockets, said jets emanating from a hot jet nozzle such as a lift engine nozzle or a lift/propulsion engine nozzle, comprising means for introducing a coolant fluid to an impingement surface immediately beneath the turning zone.

25 Claims, 4 Drawing Sheets

AIRBORNE APPARATUS FOR GROUND EROSION REDUCTION

This invention relates to means for reducing ground erosion caused by impinging hot jets, such as the jets from the propulsion and lifting gas turbine engines of Vertical/Short Take-Off and Landing (VSTOL) aircraft or the hot gases in the exhaust of vertically launched rockets.

The impingement of a lifting jet from an exhaust nozzle of a gas-turbine engine or rocket motor on a horizontal or almost horizontal surface is characterised by three distinct zones:

1. A free jet issuing from the nozzle;
2. A stagnation region surmounted by a turning zone where the jet is deflected laterally and radially outward from the point of impingement;
3. A wall jet zone where the jet moves predominantly parallel with the impingement surface.

Erosion of the most commonly used surfacing materials by an impinging jet is confined almost entirely to the region beneath the turning zone. This is because it is here that most of the heat transfer from jet to surface takes place.

Apart from ground erosion, in the case of gas-turbine powered VSTOL aircraft, the hot impinging jets produce other problems, such as hot gas ingestion and debris and dust ingestion into air intakes. These problems will be further exacerbated by the introduction of improved performance VSTOL aircraft with high temperature, high pressure lifting jets.

To counter the problems mentioned above it is known to use prefabricated aluminium sheeting or portable ground environment mats to protect the ground surface during VSTOL aircraft operations. These known protective measures can only be taken in situations where the aircraft will be landing or taking off from a pre-designated area which can then be covered with one of the known protective surfaces.

It is an object of the present invention to provide a means for reducing ground erosion, and thereby related problems, by providing apparatus to be carried on a VSTOL aircraft or any other type of vehicle, such as a vertically launched rocket, which necessitates the use of hot ground impinging jets thus allowing the aircraft or other vehicle to operate in areas other than those which have been pre-designated.

According to the present invention there is provided apparatus for avoiding ground erosion caused by impinging hot jets such as lifting jets of VSTOL aircraft or rockets, said jets emanating from a hot jet nozzle such as a lift engine nozzle or a lift/propulsion engine nozzle, comprising means for introducing coolant fluid to an impingement surface immediately beneath the turning zone.

Preferably, said means comprises means for directing a high pressure jet of fluid at relatively low temperature at the impingement surface, with the objective of providing an insulating film of fluid on the impingement surface, thereby reducing the heat transfer to it.

The fluid may be a gas such as air, or a liquid such as water, or a mixture thereof, but is preferably a fluid with a high thermal capacity, allowing a lower rate of flow to achieve a given effect.

The primary objective of the invention is to supply coolant fluid to the centre of jet impingement so that the fluid spreads radially over the impingement surface as uniformly as possible.

In one form of the invention, therefore, the fluid is arranged to flow coaxially with the impinging hot jets.

In alternative forms of the invention, where jets that are splayed (at an angle to the vertical) or of non-circular cross-section emanate from the engine in use, the coolant is introduced in a direction that does not initially correspond to the jet axis.

In yet further forms of the invention, the coolant fluid is arranged to enter the jet as far downstream from the hot jet nozzle and as close to the impingement surface as possible, in order to minimise the coolant flow rate.

In a practical aircraft installation the fluid supply may be obtained from an on-board tank via a high pressure pump, and may enter the hot jet by means of a coolant nozzle fixed to, or downstream of, a lift/propulsion or lift nozzle of an engine of the aircraft. The coolant nozzle may be supported and protected by a fairing. Both the coolant nozzle and fairing may be adapted or mounted so as to be able to swing into and out of the hot jet as required.

Embodiments of the invention will now be described by way of example only and with reference to the accompanying drawings of which;

FIG. 1a shows a conventional jet/ground interaction and;

FIG. 1b shows a jet/ground interaction with a cooling fluid being employed.

FIG. 2a is a side elevation view of a lift engine nozzle with a coolant nozzle fixed to it;

FIG. 2b is a side elevation view of a vectorable propulsion/lift engine nozzle with a coolant nozzle fixed to it;

FIG. 2c is a side elevation view of a vectorable propulsion/lift engine nozzle with a coolant nozzle fixed downstream of the engine nozzle;

FIG. 2d is a side elevation view of a lift engine nozzle with a mixed fluid coolant nozzle fixed to the engine nozzle;

FIG. 2e is a side elevation view of a vectorable propulsion/lift engine nozzle with a mixed fluid coolant nozzle fixed to it: and, FIG. 2f is a side elevation view of a vectorable propulsion/lift engine nozzle with a mixed fluid coolant nozzle fixed downstream of the engine nozzle.

For ease of reference, similar elements in the various drawings have been given identical reference numbers.

Figure 1A:
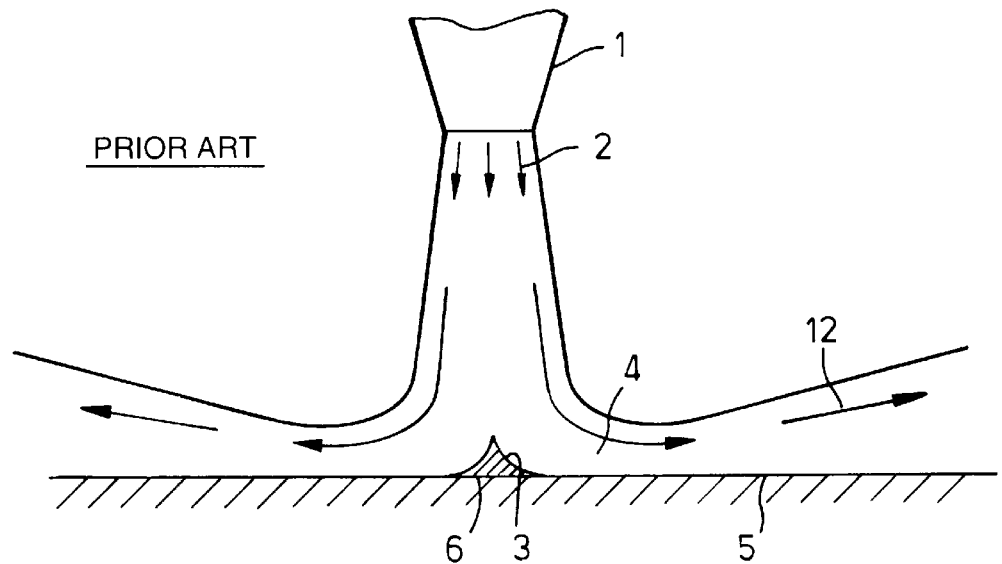
FIGS. 1a and 1b are schematic side elevation views of a known VSTOL jet and of a VSTOL jet according to the invention respectively operating in a ground environment illustrating the principles of the invention.

In FIG. 1a, a downwardly-directed exhaust nozzle 1 of a gas turbine engine or fan of a VSTOL aircraft (not shown) directs the gas turbine engine or fan exhaust efflux, or jet, 2 towards a ground surface 5 during vertical take-off or landing operations. Upon impact with the ground 5 the jet 2 is diverted into a radially expanding ground jet 12. Between the downwardly-directed jet 2 and the radially expanding jet 12 the engine jet goes through a turning zone 4. In this zone 4 the engine jet is deflected laterally and radially outward from an impingement surface 6, which is directly beneath the jet 2. A cusp shaped quasi stagnation region 3 is developed beneath the jet 2 as shown. Almost all ground erosion takes place on the surface encompassed by the turning zone 4, because it is here that most of the heat transfer from jet to surface takes place.

Figure 1B:
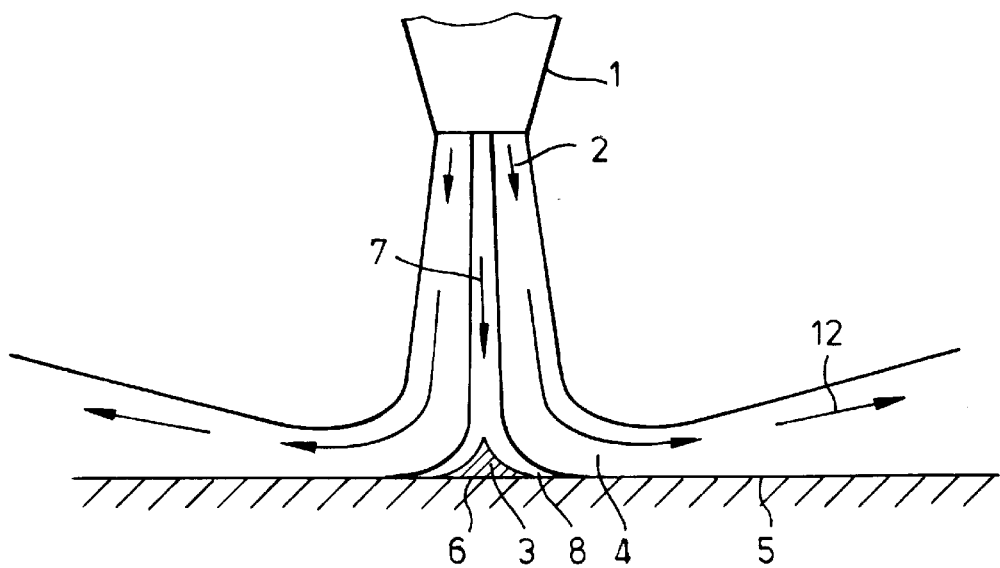

FIG. 1b illustrates the principle of providing an insulating film of fluid to the impingement surface 6 as employed by the invention. A jet of coolant such as water 7 is introduced coaxially to the engine jet flow 2 as far downstream of the engine nozzle 1 as possible. This water jet hits the impingement surface 6 and spreads outward radially as shown at 8, thus providing an insulating film of fluid on the impingement surface 6 thereby reducing the heat transfer to it.

Figure 2A:
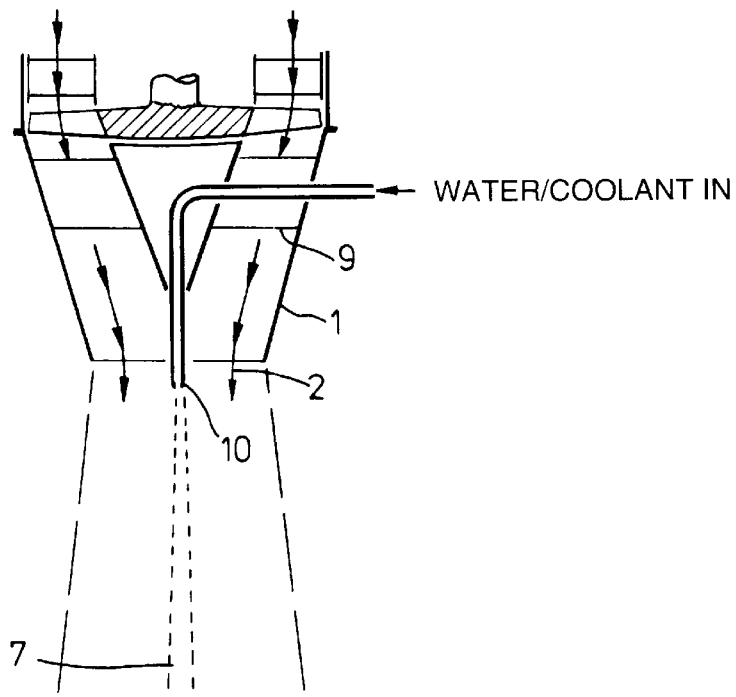
FIGS. 2a to 2f illustrate alternative applications of the invention.

FIG. 2a illustrates a coolant nozzle 10 fitted to a lift engine nozzle 1. The coolant nozzle 10 is coaxial with the lift engine nozzle 1 allowing a water jet 7 to flow coaxially with engine jet 2 emanating from the nozzle 1. A fairing 9 supports the coolant nozzle 10 and protects it from the engine jet 2. The coolant nozzle 10 is fed with water from a reservoir tank (not shown) via a pipe which passes through a side wall of the nozzle 1 and the fairing 9.

Figure 2B:
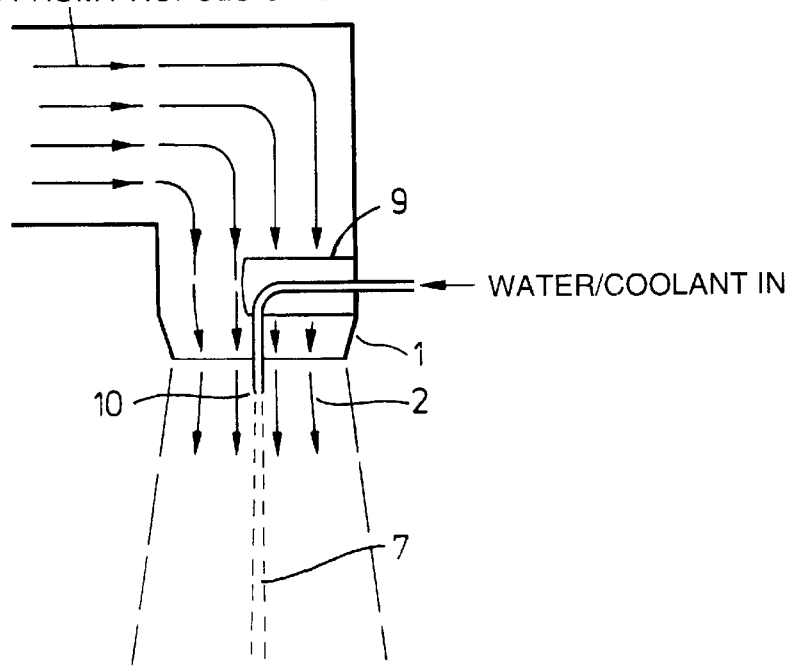

FIG. 2b illustrates a coolant nozzle 10 fitted to a vectorable propulsion/lift engine nozzle 1. The coolant nozzle 10 is again coaxial with the propulsion/lift engine nozzle 1 allowing a water jet 7 to flow coaxially with the engine jet 2 emanating from the nozzle 1. A fairing 9 supports the coolant nozzle 10 and protects it from the engine jet 2. The coolant nozzle 10 is fed as before from a reservoir tank (not shown).

Figure 2C:
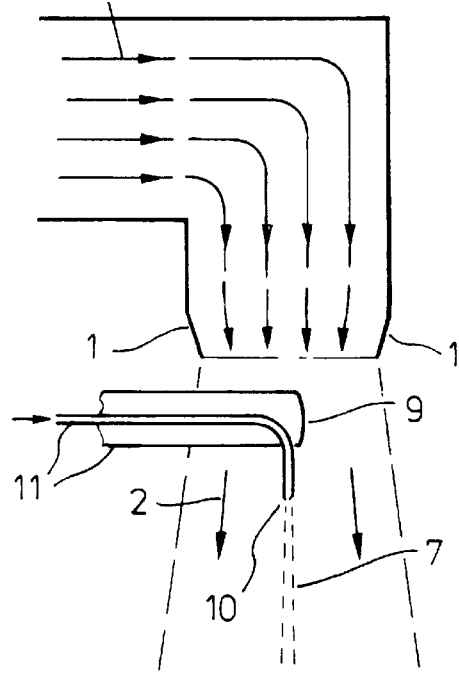

FIG. 2c illustrates a coolant nozzle 10 fixed downstream of a vectorable propulsion/lift engine nozzle 1. The coolant nozzle 10 is coaxial with the propulsion/lift engine nozzle 1, allowing a water jet 7 to flow coaxially with engine jet 2 emanating from nozzle 1. A fairing 9 supports the coolant nozzle 10 within an assembly 11 and protects it from the engine jet 2. The nozzle and fairing assembly 11 is pivotally mounted to the aircraft (not shown) so that it can be swung into and out of the engine jet flow as required.

Figure 2D:
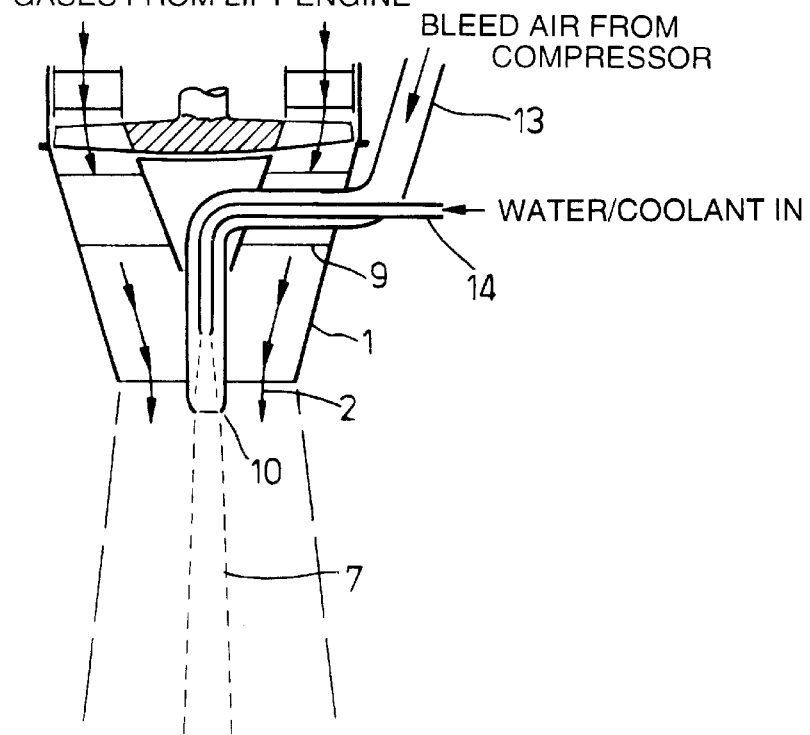

FIG. 2d illustrates a mixed fluid coolant nozzle 10 fitted to a lift engine nozzle 1. A first coolant feeder tube 13 for feeding the nozzle 10 is supported and protected by a fairing 9. Air is bled from a compressor stage of the engine (not shown) along the first coolant feeder tube 13 and a second coolant, such as water, is introduced to the coolant tube 13 at any point 14 between the compressor and the coolant nozzle 10. The coolant nozzle 10 is coaxial with the lift engine nozzle 1 allowing the air/water vapour jet 7 to flow coaxially with the engine jet 2.

Figure 2E:
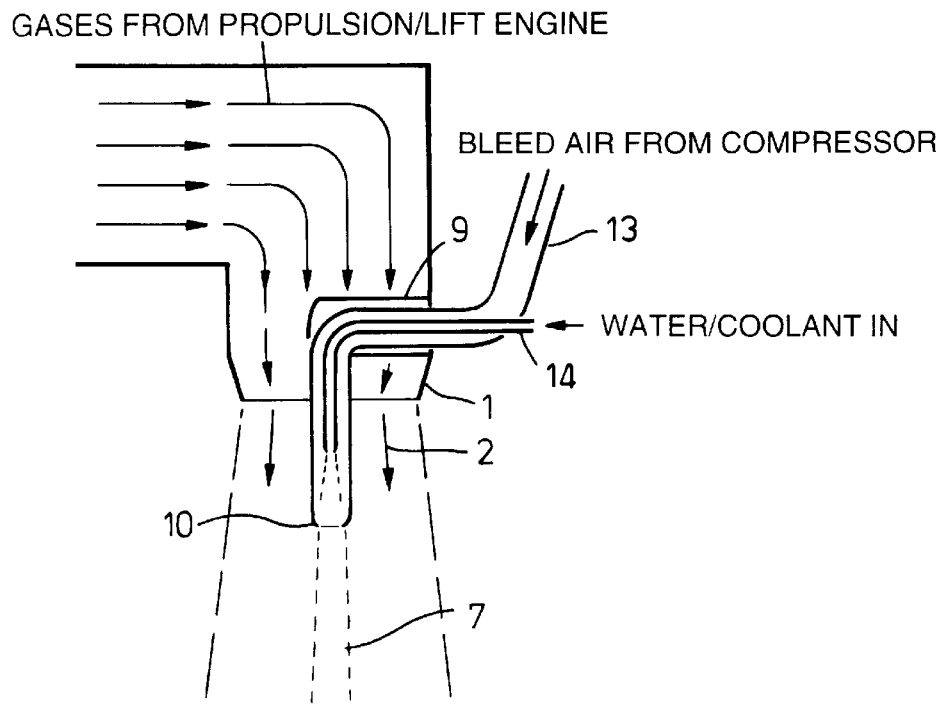

FIG. 2e illustrates a mixed fluid coolant nozzle 10 fitted to a vectorable propulsion/lift engine nozzle 1. A first coolant feeder tube 13 for feeding the nozzle 10 is supported and protected by a fairing 9. Air is bled from a compressor stage of the engine (not shown) along the first coolant feeder tube 13 and a second coolant, such as water, is introduced to the coolant tube 13 at any point 14 between the compressor (not shown) and the coolant nozzle 10. The coolant nozzle 10 is coaxial with the propulsion/lift engine nozzle 1 allowing the air/water vapour jet 7 to flow coaxially with the engine jet 2.

Figure 2F:
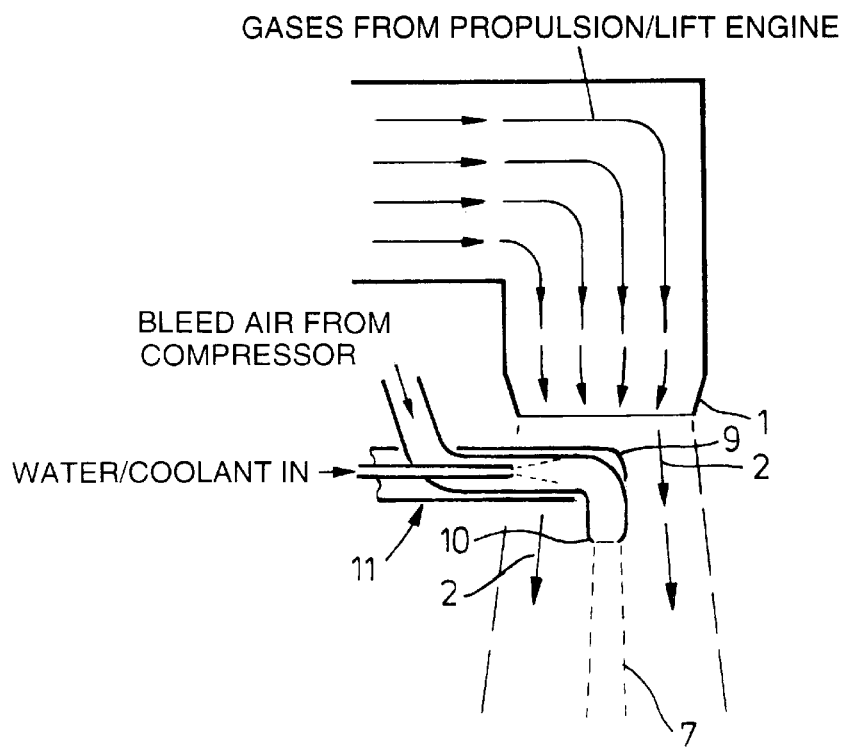

FIG. 2f illustrates a mixed fluid coolant nozzle 10 fixed downstream of a vectorable propulsion/lift engine nozzle 1. The coolant nozzle 10 is coaxial with the propulsion/lift engine nozzle 1, allowing a water jet 7 to flow coaxially with engine jet 2 emanating from nozzle 1. A fairing 9 supports the coolant nozzle 10 within an assembly 11 and protects it from the engine jet 2. The nozzle and fairing assembly 11 is pivotally mounted to the aircraft (not shown) so that it can be swung into and out of the engine jet flow as required.

Many modifications and improvements to the invention described above will now suggest themselves to those skilled in the art.

Taking by way of example the case of a recently projected STOVL aircraft which was required to perform vertical landings on an Ordinary Portland Cement Paving Quality Concrete (OPCPQC) surface at a vertical rate of descent of 4.5 feet/second. It was predicted that the minimum permissible vertical speed to avoid erosion of the OPCPQC surface was 11.7 feet/second, i.e. the desired rate of descent was less than half the "safe" rate of descent. However, fitment of the invention described above to the aircraft would enable it to operate safely at the desired rate of descent on OPCPQC surfaces. Furthermore, it is known that most of the heat transfer to the impingement surface in a vertical landing occurs in the last ten diameters of nozzle travel, thus the invention in the case cited would need to operate for only about 3.6 seconds (lifting jet nozzle diameter=1.64 feet).

Clearly, the control of coolant fluid could be linked to signals from the aircraft's altimeter such that coolant fluid is introduced into the lifting jet(s) only as the aircraft descends through a pre-determined height above the ground and at a rate of descent that is less than the minimum permissible (for an aircraft not equipped with the invention) for a particular type of surface. In the case cited the coolant fluid would need to be introduced into the lifting jet at, and below, an altitude of 16.4 feet when the aircraft was descending at lees than 11.7 feet/second.

I claim:

1. Apparatus for reducing ground surface erosion caused by hot exhaust efflux from a gas turbine engine of an aircraft having vertical or short take off and landing capability, the hot exhaust efflux emanating from the gas turbine engine through an engine nozzle, being directed to impinge upon an impingement region of the ground surface, and being diverted by the ground surface through a turning zone into a radially expanding exhaust flow, said apparatus comprising a coolant fluid delivery system for delivering coolant fluid to the impingement region such that the coolant fluid impacts the ground surface and is deflected into a laterally expanding coolant flow immediately beneath the turning zone, said coolant fluid delivery system including a fluid-transmitting conduit structure terminating in a coolant nozzle, said fluid-transmitting conduit structure comprising a first conduit for conducting bleed air from an engine compressor toward the coolant nozzle and a second conduit operatively associated with said first conduit for conducting another fluid that is introduced into the bleed air conducted by said first conduit to form a mixture of bleed air and the other fluid, the mixture exiting said fluid-transmitting conduit structure through said coolant nozzle.

2. Apparatus for reducing ground surface erosion caused by hot exhaust efflux from a gas turbine engine of an aircraft having vertical or short take off and landing capability or from a rocket engine of a rocket, the hot exhaust efflux emanating from the gas turbine engine or rocket engine through an engine nozzle, being directed to impinge upon an impingement region of the ground surface, and being diverted by the ground surface through a turning zone into a radially expanding exhaust flow, said apparatus comprising means for introducing a coolant fluid to the impingement region at pressure greater than ambient pressure such that the coolant fluid impacts the ground surface and is deflected into a laterally expanding coolant flow immediately beneath the turning zone.

3. Apparatus for reducing ground surface erosion as claimed in claim 2 in which the coolant fluid is delivered coaxially with the hot exhaust efflux.

4. Apparatus for reducing ground surface erosion as claimed in claim 2 in which the coolant fluid is delivered in a direction that does not initially correspond to an axis of the hot exhaust efflux.

5. Apparatus for reducing ground surface erosion as claimed in claim 2 in which the coolant fluid is delivered through a coolant nozzle which is located either downstream of or within the engine nozzle.

6. Apparatus for reducing ground surface erosion as claimed in claim 5 in which the coolant nozzle is protected and supported by a fairing.

7. Apparatus for reducing ground surface erosion as claimed in claim 6 in which the coolant nozzle and fairing are fitted to the engine nozzle.

8. Apparatus for reducing ground surface erosion as claimed in claim 6 in which the coolant nozzle and fairing are fitted to an airframe of the aircraft or structure of the rocket downstream of the engine nozzle.

9. Apparatus for reducing ground surface erosion as claimed in claim 6 in which the coolant nozzle and fairing can be swung into and out of a coaxial position with respect to the hot exhaust efflux as required.

10. Apparatus for reducing ground surface erosion as claimed in claim 2 in which the coolant fluid is introduced into the hot exhaust efflux by said coolant introducing means as far downstream and as close to the impingement region as possible.

11. The apparatus of claim 2, said coolant fluid introducing means comprising an on-board system operatively attached to the aircraft or rocket.

12. The apparatus of claim 2 wherein said coolant fluid introducing means is constructed and arranged to be operated only when the aircraft or rocket is in take-off or landing proximity to the ground surface.

13. Apparatus for reducing ground surface erosion as claimed in claim 2 in which a fluid with a high thermal capacity is used as a coolant.

14. Apparatus for reducing ground surface erosion as claimed in claim 2 in which water is used as a coolant.

15. Apparatus for reducing ground surface erosion as claimed in claim 2 further comprising a coolant nozzle, a fluid pumping system, and an on-board tank, the coolant fluid being stored in the on-board tank and being pumped from the on-board tank to the coolant nozzle by the fluid pumping system.

16. The apparatus of claim 2, wherein the coolant introducing means introduces the coolant fluid to about the center of the impingement region such that the coolant fluid impacts the ground surface and is deflected into a radially expanding coolant flow immediately beneath the turning zone.

17. Apparatus for reducing ground surface erosion caused by hot exhaust efflux from a gas turbine engine of an aircraft having vertical or short take off and landing capability, the hot exhaust efflux emanating from the gas turbine engine through an engine nozzle, being directed to impinge upon an impingement region of the ground surface, and being diverted by the ground surface through a turning zone into a radially expanding exhaust flow, said apparatus comprising means for introducing a coolant fluid to the impingement region such that the coolant fluid impacts the ground surface and is deflected into a laterally expanding coolant flow immediately beneath the turning zone, wherein said coolant introducing means includes a first fluid delivery system by which air is tapped off at a tapping point in an early stage of compression from the gas turbine engine and used as cooling fluid.

18. Apparatus for reducing ground surface erosion as claimed in claim 17 wherein said coolant introducing means includes a coolant nozzle and a second fluid delivery system by which another fluid is introduced into the air between the tapping point and the coolant nozzle.

19. Apparatus for reducing ground surface erosion caused by hot exhaust efflux from a gas turbine engine of an aircraft having vertical or short take off and landing capability or from a rocket engine of a rocket, the hot exhaust efflux emanating from the gas turbine engine or rocket engine through an engine nozzle, being directed to impinge upon an impingement region of the ground surface, and being diverted by the ground surface through a turning zone into a radially expanding exhaust flow, said apparatus comprising a coolant fluid delivery system delivering a coolant fluid at pressure greater than ambient pressure to the impingement region such that the coolant fluid impacts the ground surface and is deflected into a laterally expanding coolant flow immediately beneath the turning zone.

20. The apparatus of claim 19 wherein said coolant fluid delivery system comprises at least one fluid transmitting conduit structure terminating in a coolant-emitting nozzle.

21. The apparatus of claim 20 wherein said coolant-emitting nozzle is located downstream of said engine nozzle.

22. The apparatus of claim 20 wherein said coolant-emitting nozzle is located within said engine nozzle.

23. The apparatus of claim 20 wherein said coolant fluid delivery system comprises an on-board storage tank and a fluid pumping system, said fluid pumping system pumping coolant fluid from said storage tank, through said fluid transmitting conduit structure, and out of said coolant nozzle.

24. The apparatus of claim 19, said coolant fluid delivery system comprising an on-board system operatively coupled to the aircraft or rocket.

25. The apparatus of claim 19, wherein said coolant fluid delivery system is constructed and arranged to deliver the coolant fluid to about the center of the impingement region such that the coolant fluid impacts the ground surface and is deflected into a radially expanding coolant flow immediately beneath the turning zone.

\* \* \* \* \*